United States Patent
Crespo Vidal

(10) Patent No.: US 8,991,268 B2
(45) Date of Patent: Mar. 31, 2015

(54) METHOD FOR DETERMINING THE BREAK-AWAY FORCE OF AN ACTUATOR

(75) Inventor: Fausto Crespo Vidal, Langenselbold (DE)

(73) Assignee: Samson AG, Frankfurt am Main (DE)

( * ) Notice: Subject to any disclaimer, the term of this patent is extended or adjusted under 35 U.S.C. 154(b) by 185 days.

(21) Appl. No.: 13/591,199

(22) Filed: Aug. 21, 2012

(65) Prior Publication Data

US 2013/0047745 A1 Feb. 28, 2013

(30) Foreign Application Priority Data

Aug. 22, 2011 (DE) .......................... 10 2011 052 901

(51) Int. Cl.
*G01D 1/00* (2006.01)
*G01L 1/06* (2006.01)
*F16K 37/00* (2006.01)

(52) U.S. Cl.
CPC ................................ *F16K 37/0083* (2013.01)
USPC ........................................ 73/862.53; 73/862

(58) Field of Classification Search
CPC ............ F16K 37/0083; F16K 37/0091; F16K 31/046; F16K 37/0041; F16K 31/055; F16K 17/04; F16K 31/041; F16K 31/047; F16K 37/0075; F16K 1/221; F16K 24/00; F16K 31/00; F16K 31/042; F16K 31/043; F16K 3/22; F16K 11/18; F16K 15/026
USPC ..................................................... 73/862.53
See application file for complete search history.

(56) References Cited

U.S. PATENT DOCUMENTS

| | | | |
|---|---|---|---|
| 4,896,101 A | 1/1990 | Cobb | |
| 5,008,841 A | 4/1991 | McElroy | |
| 5,231,469 A | 7/1993 | Jeffers et al. | |
| 5,433,245 A * | 7/1995 | Prather et al. | ................. 137/554 |
| 5,487,302 A | 1/1996 | Casada et al. | |

(Continued)

FOREIGN PATENT DOCUMENTS

| | | |
|---|---|---|
| DE | 4419548 A1 | 12/1995 |
| DE | 4423102 A1 | 1/1996 |

(Continued)

OTHER PUBLICATIONS

European Patent Office, European Extended Search Report, Dec. 3, 2012, pp. 1-8, File No. 12181316.6-2206, Applicant: Samson AG, Munich, Germany.
German Patent and Trademark Office, German Patent Examination Report, German Patent Application Serial No. 10 2011 052 901.2, Applicant Samson AG, Mar. 22, 2012, Munich, Germany, p. 1-6.

*Primary Examiner* — Lisa Caputo
*Assistant Examiner* — Jamel Williams
(74) *Attorney, Agent, or Firm* — Woodling, Krost and Rust

(57) ABSTRACT

A method for determining a break-away force in an actuator is provided, the actuator comprising an actuator armature including a positioning element movable in relation to the actuator housing. The positioning element is movable by means of an actuator drive such that a driving force is applied through the actuator drive to the positioning element. The actuator is in a resting state in the beginning, the driving energy required for moving the actuator drive is successively increased, wherein the driving energy is converted into a driving force by driving means, and a measurement value at the actuator drive is measured by at least one sensor, wherein as soon as a change of the measurement value is detected, a state is verified in which a holding force counteracts the movement of the position element.

20 Claims, 1 Drawing Sheet

(56) References Cited

U.S. PATENT DOCUMENTS

| | | | |
|---|---|---|---|
| 5,492,009 A * | 2/1996 | Kempf et al. | 73/168 |
| 5,524,484 A * | 6/1996 | Sullivan | 73/168 |
| 6,119,515 A | 9/2000 | Kemmler et al. | |
| 6,131,609 A * | 10/2000 | Metso et al. | 137/552 |
| 6,267,138 B1 * | 7/2001 | Hoffmann et al. | 137/551 |
| 6,341,552 B1 * | 1/2002 | Potter et al. | 91/433 |
| 6,637,267 B2 * | 10/2003 | Fiebelkorn et al. | 73/587 |
| 7,584,643 B2 * | 9/2009 | Hoffman | 73/1.72 |
| 8,342,478 B1 * | 1/2013 | Cordray et al. | 251/129.03 |
| 2006/0185418 A1 | 8/2006 | Hoffman | |
| 2008/0163937 A1 * | 7/2008 | Esposito | 137/487.5 |
| 2010/0152907 A1 | 6/2010 | Meier et al. | |
| 2011/0005306 A1 * | 1/2011 | Warren et al. | 73/81 |
| 2012/0275504 A1 * | 11/2012 | Karte | 375/224 |

FOREIGN PATENT DOCUMENTS

| | | |
|---|---|---|
| DE | 19643297 C1 | 3/1998 |
| DE | 10209545 A1 | 10/2003 |
| DE | 102005004477 A1 | 8/2006 |
| DE | 102008062292 A1 | 6/2010 |

* cited by examiner

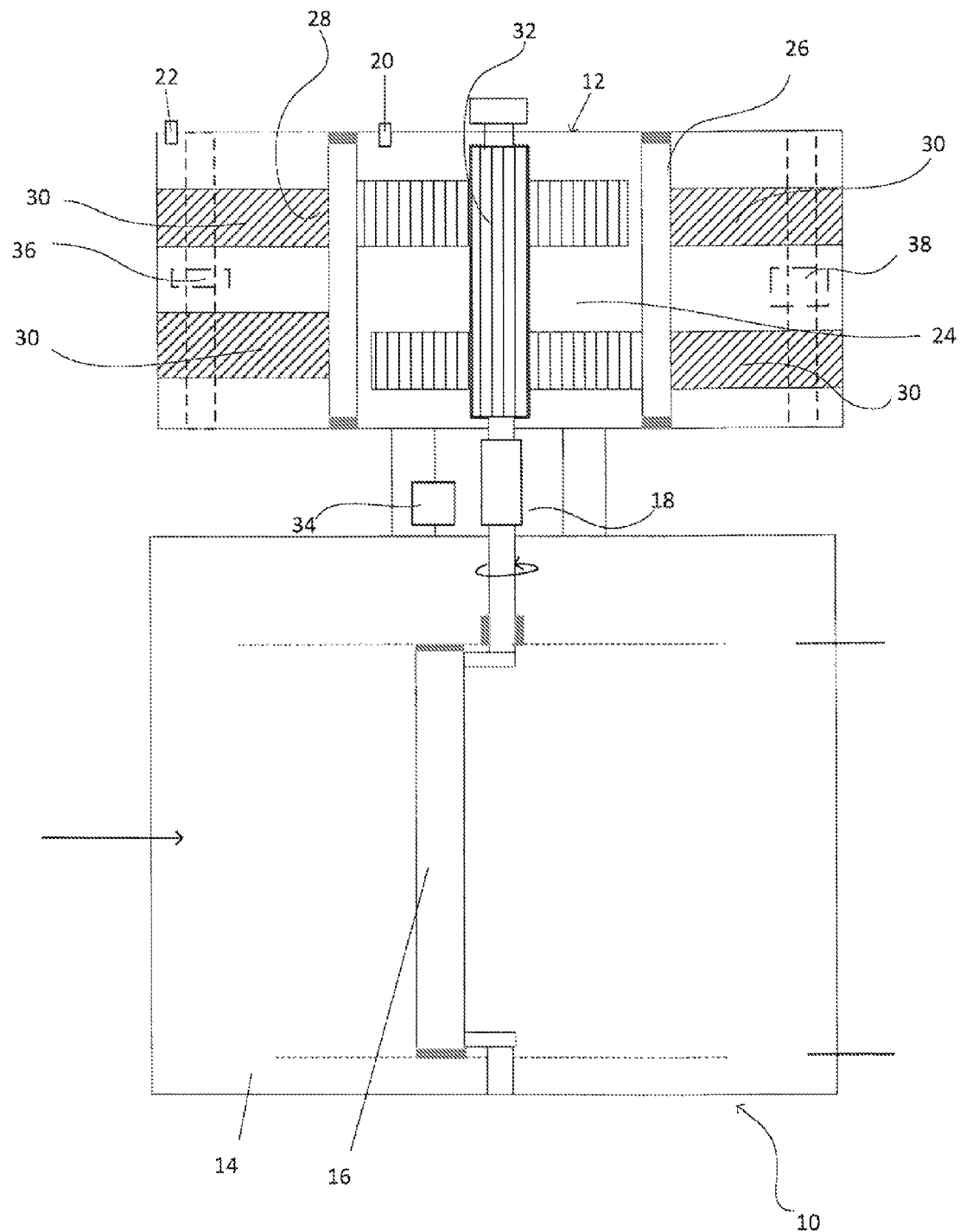

METHOD FOR DETERMINING THE BREAK-AWAY FORCE OF AN ACTUATOR

This application claims the benefit and priority of and to German Patent Application No. DE 10 2011 052 901.2, filed Aug. 22, 2011 and the same is incorporated herein in its entirety by reference hereto.

The invention refers to a method for determining a break-away force of an actuator, the actuator comprising an actuator armature including a positioning element movable in relation to the actuator housing, the positioning element be movable by means of an actuator drive thereby that a driving force is applied through the actuator drive to the positioning element. The invention also refers to a method for carrying out a partial stroke test for determining a break-away force of an actuator.

With respect to actuators, in particular safety related actuators, an occasional examination of the functionality is required in order to effectively ensure a reliable operation of the actuator.

In general, a break-away force has to be applied by a connected actuator drive in order to move the positioning element, where the break-away force is slightly larger than the largest holding force appearing in the system. The maximum holding force can be defined by the drive as well as also by the positioning armature.

Because the actuators are, as a rule, in an immovable position, it happens by depositions, corrosion or based on external influences that the holding force is varied considerably in the course of time. The holding force is always different in individual cases and, therefore, it cannot be predicted or calculated in advance.

DE 196 43 297 C1 discloses a method for determining a break-away time. Therein, the driving energy is increasingly put up in order to determine the break-away force upon starting of the movement of the positioning element based on the time required for controlling the movement of the positioning element. Based on this determined "break-away time" conclusions as to the state of the actuator may be made.

It is a disadvantage that a movement of the actuator is required in order to analyze the actuator. A determination of a force which is slightly smaller than the predicted holding force cannot be carried out with this method.

According to the state of the art, the break-away force or the holding force, respectively, is, therefore, determined thereby that the driving force is put up (up to a maximum available driving force) until the break-away force is exceeded and the actuator is moved.

This has the disadvantage that a correspondingly high force acts onto the actuator after the break-away which force is not required anymore because of the distinctly lower sliding friction. Therefore, the actuator is moved beyond the desired target position in an uncontrolled way. The so-called "slip-stick-effect" is the result. This influences the process which is currently performed, in a negative way.

It is an objective of the invention, to at least approximately evaluate the state of the actuator while avoiding the above-mentioned deficiencies in which state the maximum holding force is present.

The invention refers to a method for determining the break-away force which is slightly larger than the maximum holding force, in an actuator, in particular in a safety actuator.

As is known, the actuator comprises a positioning element which is movable in relation to a housing of the actuator armature. The positioning element is moved through the actuator drive thereby that a driving force is applied to the position element by the actuator drive. The driving force is generated thereby that the driving energy which is input into the drive, is converted into a driving force through driving means.

The force which is generated by the driving energy acts against the holding force which is caused by the drive and/or the actuator armature. The movement of the positioning element starts as soon as the break-away force is reached, and the holding force has been slightly exceeded.

The actuator is in a rest position in the beginning. Starting from this point, the driving energy required for the movement of the drive, is increasingly, in particularly stepwise, increased.

Furthermore, at least one sensor, in particular an analogue sensor, is provided for measuring at least one of the measurement values at the actuator drive.

According to the invention, as soon as a change of the measurement value with respect to the resting state is detected, a conclusion as to the state is made in which a slight increase of the driving energy leads to the required break-away force. In particular, the signal of the measurement value generated by the sensor is, in this case, larger than a predetermined threshold level. From an iterative increase of the driving energy, it can be determined that the actuator will break-away and, therefore, move on occasion of an increase of the driving energy in the subsequent step.

According to the method of the invention, a state can be verified in which the maximum holding force is approximately reached, not yet, however, the break-away force. Consequently, the positioning element is not yet moving in this state. Thereby, an uncontrolled movement of the positioning element is prohibited which avoids negative influences on the process currently performed. Since only the response of the sensor is evaluated for predicting the maximum holding force, there is the further advantage that no characteristic time behavior is necessary for predicting the holding force.

The method can be applied to pneumatically or electrically operated actuators in an adapted manner. According to the invention, piston drives or membrane drives are included in pneumatic drives. With pneumatic drives, the build-up of the force can be affected very slowly by corresponding pulses of supplied air, in order to evaluate the desired equilibrium or balance point with high accuracy. Furthermore, the method can at least be applied to actuators with pivotal drive or stroke drive, wherein the transmission of the movement is affected directly or through levers or toothed rods.

Preferably, the method of the invention can be designed such that the sensor is formed as a movement sensor or position sensor for measuring a positional change.

The sensor, in particular the position sensor, can be mounted such that it detects the positional change of a drive means. In particular, the position or the positional change, respectively, of a component is detected which carries out the same movement like the positioning element. This may be the drive means itself or a connection element connecting the drive means to the positioning element. The positional change is detected without a movement of the positioning element taking place.

To implement the measurement of the position/positional change at a drive means, has the advantage that a sensor which is anyway provided for checking the movement of the positioning element, can also be used for evaluating the break-away or holding force, respectively. With this implementation, a conclusion on the balance or parity of the forces can be made without a direct application of force being measured.

In an advantageous way, the drive means may be a drive shaft in the case of a pneumatic drive for a pivot armature which shaft converts the translational movement of a toothed rod fixed to at least one piston or from a lever drive into a rotational movement. The piston is sealed against the actuator housing by means of a sealing element, wherein the sealing element comprises a deformation range based on its elasticity in which range the piston may move while the sealing element still adheres to the actuator housing. Thereby, a micro movement is the result which enables the detection of the rotational movement of the drive shaft without an actual movement of the piston and, thereby, of the drive taking place. In this way, the holding force can be estimated without moving the positioning element.

Therefore, the positional sensor can detect, based on the elasticity of the sealing elements and stops or other tensional forces in the housing or in the total construction, a positional change or a rotational movement of the drive shaft, respectively, prior to an actual movement of the drive being affected. The relevant range of movement of the positioning element prior to the actual movement of the positional element can be within about 0.1% to 1% of the total movement range of the positional element. According to the invention, as soon as this movement is detected, a state is decided in which the drive is just about to break away.

In particular with stroke drives, a holding force can be generated, among others, by a sealing element which is located between the positioning rod and the armature housing. The positioning rod connects the positioning element with the drive. In this embodiment, a micro movement of the positioning element can be measured with a position sensor. The micro movement is within the range of the deformation range of the sealing element, wherein a movement is taking place only in a range within which the sealing element still adheres to the positioning rod. As soon as a micro movement of the positioning element with respect to the housing is measured within the deformation range of the sealing element, in particular by detecting a positional change, a conclusion is made according to the invention as to an approximate parity of forces between the holding force and the driving force wherefrom an approximate break-away force is obtained.

In a further advantageous embodiment, the deformation of the drive housing can be detected as measurement value, it has been ascertained that an elastic deformation is resulting from the counteraction of the holding force and the driving force generated by the drive energy. Basically, a conclusion can thereby be made with a previously defined deformation as to the approximate balance between holding force and break-away force. This can be affected by the deformation of the drive housing or based on a compression or rotation of the connection element between the actuator drive and the actuator.

The deformation may advantageously be detected by at least one strain gauge. The strain gauge can be arranged on the drive housing or on a connection element between the actuator drive and the actuator.

A particularly advantageous location of mounting the sensors for the detection of the tensioning of the drive housing in the case of a piston drive for pivotal drives, the range of the pistons in a final end position has been identifies with the springs being tensioned or compressed, respectively, to a maximum.

Furthermore, it is possible to measure a corresponding deformation of the drive housing also by means of a position sensor which is arranged at a distance from the drive shaft. Since a displacement of the housing with respect to the drive shaft results from elastic deformation, this will be detected by the position sensor as positional change and results in a corresponding signal.

In a further advantageous embodiment, an acoustic sensor may be provided as sensor which is connected to the housing of the actuator drive whereby the equality of the movement force and the holding force is assumed when detecting a unique acoustical signal. It happens that, while rising drive force, immediately prior to the breaking away of the positioning element, an acoustical signal in form of a "click" is occurring which may be detected and processed through an acoustic sensor.

In particular, the acoustic sensor is embodied as a body noise sensor since such a sensor primarily detects vibrations transmitted through the housing. The body noise sensor is, thereby, insensitive with respect to noises of the surroundings. This improves the signal/noise-ratio upon using a body noise sensor with respect to a normal acoustic sensor since the relevant signal is primarily transmitted as vibrations of the housing.

A sensor which is provided for carrying out the method can be implemented as touch-less sensor as far as this is possible with regard to the physical principal of action.

Preferably, for evaluating the measurement value, a sensor is used which has a low hysteresis. Also a high sensitivity proves as advantageous in carrying out the invention.

Using a magnetic field sensor as position sensor has proven to be particularly advantageous.

Such a sensor can measure without hysteresis the position and the orientation of a magnet with high precision in particular of a magnet mounted on the drive shaft. In the example of a pivotal drive with a drive shaft, the portion of the signal generated by the rotational movement of the drive shaft as well as the portion of the signal which results from a literal displacement of the drive shaft with respect to the magnet field sensor, may be evaluated in order to detect the movement of the drive shaft prior to the movement of the positioning element being effected.

For the regular check of security related valves, Partial Stroke Tests have been adopted. In a Partial Stroke Test, PST, the armature is moved by a partial distance of its adjustable stroke. For this purpose, a pulse extending through a predefined, short period of time, is given in particular with electromagnetic valves used for the control of the input air pressure of a pneumatic drive, and, thereafter, the movement distance corresponding to the switching period is evaluated. Since the movement distance is, as a rule, very short, in particular 5%-10% of the adjustable stroke, also the pulse duration of the control signal is correspondingly short.

In order to exclude a movement beyond the target value predefined for the partial stroke test, the pulse duration required for carrying out the PST, is evaluated by a method known per se in which, starting with short pulses, increasingly longer pulses are generated until the movement distance reached is within a movement range relevant for the PST, in particular within 5%-10% of the adjustable stroke.

Since the dead time of the actuator to be controlled may be longer than the required control time of the magnetic valve, the Partial Stroke Test is started with very short pulse duration. In case this pulse duration does not result in a movement of the positioning element, the pulse duration is prolonged for the next cycle by a pulse increment.

It is a disadvantage of this method that the pulse duration in a subsequent pulse is not allowed to be so long that the maximum movement distance is exceeded. This has the consequence that the pulse increments have to be very small in the course of increasing the pulse duration. Since there must be an interval between each pulse, so that the required positioning pressure is again build up in the drive means, it is very time consuming to carry out a successful PST.

It is, furthermore, object of the invention, to provide a method for carrying out a PST whereby the PST may be carried out quickly and reliably.

In a manner known per se, the pulses required for the PST are sent with a predetermined pulse length to the positioning armature in order to move the positioning armature in relation with the pulse duration. The pulse duration is prolonged starting from a very short pulse step by step by a pulse increment until a movement distance relevant for the PST is reached.

According to the invention, the pulse increment is selected to be relatively high in the beginning, and the pulse duration is, therewith, enlarged until a micro movement of the positioning armature, in particular of the actuator drive, is measured. After the micro movement has been ascertained, the pulse increment is reduced to a smaller value. Besides the detection of a micro movement, also another above-mentioned method for determining the maximum holding force may be used.

This has the advantage that a PST can be carried out in very snort time in spite of the continuous increase of the pulse length by a pulse increment. This is because the pulse increment needs not to be selected unnecessarily small out of safety reasons. By means of the method of the invention, one can approach the critical pulse length quickly with a large pulse increment and, only upon reaching the critical pulse duration, the length of the pulse increments is reduced. Thereby, the required time for carrying out a PST is remarkably reduced and the reliability of such a test is remarkably put up.

In a further embodiment for using the inventive method, the detected equality of forces between the drive force and the holding force can be used as a prove for the functionality of the magnetic valve in case of using a security related, pneumatic or hydraulic actuator which is controlled through a magnetic valve.

This facilitates the localization of problems in an error diagnosis. In the state of the art where the functionality of the actuator is evaluated by moving the actuator it cannot be reliably differentiated between the effect of a magnet valve or a sticking of the actuator as long as a movement of the actuator is not affected.

Further advantages, features and potential applications of the present invention may be gathered from the description which follows, in conjunction with the embodiments illustrated in the drawing.

Throughout the description, the claims and the drawings, those terms and associated reference signs will be used as are notable from the enclosed list of reference signs. In the drawing:

FIG. 1 is a positioning armature with a connected break-away in a schematic section view.

FIG. 1 shows a security related positioning armature 10 which is connected to an actuator drive 12 in a schematically section view where the positioning element is shown in a closed position with balanced pressure chamber 24.

The positioning armature 10 comprises an actuator housing 14 for the connection to a fluidic system. A positioning element 16 is enclosed in the armature housing 14. The positioning element may be moved by a rotational movement from an open position to a closed position. The positioning element 16 is connected to a drive shaft 32 of the actuator drive 12 through a connection element 18. The actuator drive 12 is embodied as a pneumatic actuator drive. For supplying and draining air, respective connections 20, 22 are provided. The connection 20 leads into the pressure chamber 24, the side walls of which are moveable sideways by means of respective pistons 26, 28 against the force of springs 30. The connection 22 leads into a spring chamber which is located on the other side of the piston 26. A toothed rod each is hinched to the pistons 26, 28 which toothed rods are engaged with the drive shaft 32 and rotate the drive shaft 32 upon a lateral movement of the pistons 26, 28. The movement of the pistons is affected by supplying pressurized air to the pressure chamber 24 against the force of the springs 30. Upon draining the pressurized air from the pressure chamber 24, the movement of the pistons 26, 28 is affected by the springs 30. The effective drive energy which is converted through the pistons 26, 28 and the drive shaft 32 to a driving force, results in this case from the difference of the spring force with respect to the pressure force.

In the area of the connection element 18, a position sensor 34 is mounted for detected a rotational movement. The position sensor 24 could, however, also be arranged at the housing of the actuator drive 12 at an end of the drive shaft 32 remote from the connection element 18.

As is schematically shown, in an alternative, a strain gauge 36 or a body noise sensor 38 may be arranged at the housing of the actuator drive 12. A particularly advantageous mounting location of the strain gauge 36 or the body noise sensor 38, respectively, is shown in FIG. 1. The sensors 36, 38 are located, in a vertical direction, at approximately the center of the vertical dimension of the housing and, in horizontal direction, in the area of the end position of the pistons 26, 28 with tensioned springs 30.

In the case of a movement test in which a movement of the positioning element 16 and/or the pistons 26, 28 requires an increased break-away force because of external influences or because of ageing, a movement of the actuator drive 12 is detected upon controlling the actuator armature 10 although still no movement of the positioning element 16 and/or the pistons 26, 28 takes place. In this way the sensor 34 for example detects a micro movement of the connection element 18 which is smaller than 1°. In case a corresponding movement is detected, one can conclude that a drive force is reached which nearly corresponds to the break-away force and approximately corresponds to the holding force.

This state can also be verified by reading the strain gauge 36 mounted on the housing of the actuator drive 12 thereby that the resistance of the strain gauge 36 is changed based on the tensioning of the housing prior to reaching the break-away force.

The approximate balance of the forces between the break-away force and the drive force can also be detected by means of the body noise sensor 38. Tensioning of the housing results in a clearly identifiable noise immediately before the positioning element 16 breaks away. The noise may be a "click" which is easily detected by the body noise sensor 38.

Because the equality or balance of forces between the drive force and the break-away force can now be approximately determined, this information can be used in a particular advantageous way for carrying out the partial stroke test. Since no fixed, stepwise approach to an unknown break-away force is required the duration of the test may be shorten considerable without a risk of overshooting.

LIST OF REFERENCE SIGNS

10 actuator armature
12 actuator drive
14 armature housing
16 positioning element
18 connection element
20 connection
22 connection 24 pressure chamber
26 piston
28 piston
30 spring
32 drive shaft
34 sensor
36 strain gauge
38 body noise sensor

The invention claimed is:

1. Method for determining a break-away force in an actuator, said actuator comprising an actuator armature including a positioning element movable in relation to an actuator housing, said positioning element being movable by means of an actuator drive, a driving force is applied through said actuator drive to said positioning element, wherein said actuator is in a resting state in the beginning, the driving energy required for moving said actuator drive is successively increased, wherein said driving energy is converted into said driving force by driving means, and a measurement value of said actuator drive is measured by at least one sensor, wherein as soon as a change of said measurement value is detected, a state is verified in which a holding force which counter acts movement of said positioning element, and said driving force generated by said driving means, are balanced, wherein a slight increase of said driving force generates the said break-away force.

2. Method according to claim 1, wherein a change in the position of said driving means is measured as said measurement value and wherein said at least one sensor is implemented as a position sensor which cooperates with said driving means.

3. Method according to claim 1, wherein noise is measured as said measurement value, said noise is generated by the mechanical tensioning of said actuator drive, and wherein said sensor which is implemented as a body noise sensor, is connected to the housing of said actuator drive.

4. Method according to claim 1, wherein the tensioning of a component of said actuator is measured as said measurement value and wherein at least one strain gauge is provided on the housing of said actuator drive is measuring said measurement value, wherein a predetermined tensioning is set as a threshold value.

5. Method according to claim 1, wherein said measurement value is detected by a non-contact sensor.

6. Method according to claim 1, wherein a safety related actuator is used.

7. Partial stroke test for determining a break-away force in an actuator, said actuator comprising an actuator armature including a positioning element movable in relation to an actuator housing, said positioning element being movable by means of an actuator drive such that a driving force is applied through said actuator drive to said positioning element, wherein said actuator is in a resting state in the beginning, wherein starting therefrom, the driving energy required for moving said actuator drive is successively increased based on an algorithm, wherein said driving energy is converted into said driving force by driving means, wherein at least one sensor is provided on said actuator drive for measuring at least one measurement value, wherein a step width of said driving energy is chosen to be relatively large until a change of said measurement value is detected, and wherein, from this state a conclusion is made as to the situation in which a holding force which counter acts the movement of said positioning element, and said driving force generated through said driving means, are approximately balanced, and wherein, thereafter, an algorithm is changed for adapting said step width.

8. Partial stroke test according to claim 7, wherein said algorithm for adapting said step width is changed such that said step width is reduced.

9. Partial stroke test according to claim 7, wherein the positional change of said driving means is measured as said measurement value and wherein said at least one sensor is embodied as position sensor which cooperates with said driving means.

10. Partial stroke test according to claim 7, wherein noise is measured as said measurement value, said noise is generated by changes of the mechanical tension of said actuator drive, wherein said at least one sensor is implemented as a body noise sensor which is in connection with the housing of said actuator drive.

11. Partial stroke test according to claim 8, wherein a change in the position of said drive means is measured as said measurement value, and wherein said at least one sensor is embodied as a position sensor which cooperates with said drive means.

12. Partial stroke test according to claim 8, wherein noise is measured as said measurement value, said noise is generated by changes of the mechanical tensioning of said actuator drive, for which purpose said at least one sensor is embodied as a body noise sensor which is connected to the housing of said actuator drive.

13. Partial stroke test according to claim 7, wherein the tensioning of a component of said actuator is measured as said measurement value, and wherein at least one strain gauge is provided on the housing of said actuator drive, where a predetermined tensioning is set as a threshold value.

14. Partial stroke test according to claim 7, wherein said actuator is a safety related actuator.

15. Partial stroke test for determining a break-away force in an actuator, said actuator comprising an actuator armature including a positioning element movable in relation to the actuator housing, said positioning element being movable by means of an actuator drive such that a driving force is applied through said actuator drive to said positioning element, wherein said actuator is in a resting state in the beginning, wherein starting therefrom, the driving energy required for moving said actuator drive is successively increased based on an algorithm, wherein said driving energy is converted into a driving force by driving means, at least one sensor is provided on said actuator drive for measuring said at least one measurement value, wherein a step width of said drive energy is chosen to be relatively large until a change of said measurement value is detected and, thereby, a state is decided in which a holding force which counter acts the movement of said positioning member, and a driving force generated by said driving energy, are approximately balanced, and wherein, thereafter, an algorithm is changed for adapting said step width, and wherein said algorithm for adapting said step width is changed such that said step width is reduced, and wherein a change in the position of said drive means is measured as said measurement value and said at least one sensor is provided as a position sensor which cooperates with said drive means, wherein said measurement value is detected by a non-contact sensor.

16. Partial stroke test according to claim 15, wherein said actuator is a safety related actuator.

17. Device for determining a break-away force in an actuator, said actuator comprising an actuator armature including a positioning element movable in relation to an actuator housing, wherein said positioning element is movable by means of an actuator drive such that a driving force is applied through said actuator drive to said positioning element, wherein said actuator is in a resting state in the beginning, the driving energy required for moving said actuator drive is successively increased, wherein said driving energy is converted into a driving force by driving means, and a measurement value of said actuator drive is measured by at least one sensor, wherein as soon as a change of said measurement value is detected, a state is verified in which a holding force which counter acts the movement of said positioning element, and a driving force generated by said driving energy, are balanced, wherein a slight increase of said driving force generates said breakaway force.

18. Device according to claim 17, wherein said actuator is a safety related actuator.

19. Method according to claim 2, wherein said measurement value is detected by a non-contact sensor.

20. Partial stroke test according to claim 8, wherein the tensioning of a component of said actuator is measured as said measurement value, and wherein at least one strain gauge is provided on the housing of said actuator drive, where a predetermined tensioning is set as a threshold value.

\* \* \* \* \*